US010725658B2

(12) United States Patent
Beaty et al.

(10) Patent No.: US 10,725,658 B2
(45) Date of Patent: Jul. 28, 2020

(54) KEYBOARD INTERFACE FOR EFFICIENTLY SELECTING FROM A SET OF DATA ITEMS

(71) Applicant: Redcritter Corp., Flower Mound, TX (US)

(72) Inventors: Robert Michael Beaty, Flower Mound, TX (US); James Leon Rockett, Jr., Carrollton, TX (US)

(73) Assignee: Redcritter Corp., Flower Mound, TX (US)

( * ) Notice: Subject to any disclaimer, the term of this patent is extended or adjusted under 35 U.S.C. 154(b) by 257 days.

(21) Appl. No.: 15/595,453

(22) Filed: May 15, 2017

(65) Prior Publication Data

US 2018/0329624 A1 Nov. 15, 2018

(51) Int. Cl.
*G06F 3/023* (2006.01)
*G06F 3/0488* (2013.01)
*G06F 3/0482* (2013.01)
*H04M 1/2748* (2020.01)
*G06F 15/02* (2006.01)

(52) U.S. Cl.
CPC ........ *G06F 3/04886* (2013.01); *G06F 3/0233* (2013.01); *G06F 3/0482* (2013.01); *H04M 1/2748* (2020.01); *G06F 15/0225* (2013.01); *H04M 2250/70* (2013.01)

(58) Field of Classification Search
CPC .. G06F 3/0412; G06F 3/04886; G06F 3/0488; G06F 3/041; G06F 3/0233; G06F 15/0225
See application file for complete search history.

(56) References Cited

U.S. PATENT DOCUMENTS

| 6,744,451 | B1 * | 6/2004 | Anderson | G06F 1/1626 |
| | | | | 715/772 |
| 7,262,761 | B1 * | 8/2007 | Duarte | H04M 1/2748 |
| | | | | 345/168 |
| 7,711,549 | B2 * | 5/2010 | Feinberg | G06F 3/0483 |
| | | | | 704/1 |
| 2005/0182766 | A1 * | 8/2005 | Feinberg | G06F 3/0485 |
| 2007/0156686 | A1 * | 7/2007 | Kim | G06F 3/04817 |
| 2008/0250352 | A1 * | 10/2008 | Zaliva | G06F 3/0236 |
| | | | | 715/816 |
| 2009/0079702 | A1 * | 3/2009 | Colley | G06F 3/04886 |
| | | | | 345/173 |

(Continued)

*Primary Examiner* — Shen Shiau
(74) *Attorney, Agent, or Firm* — Kirton McConkie; Brian Tucker

(57) ABSTRACT

A keyboard interface enables the efficient selection of one or more data items from a set of data items. The appearance of the keyboard interface can be dynamically generated and updated based on characteristics of the data items in the set. When a user selects a user interface element associated with a set of data items, the data items in the set can be evaluated to determine a number of keys to include in the keyboard interface as well as which characters are assigned to each included key. The number of keys and which characters are assigned to these keys can be determined by identifying a first character in each of the data items in the set. When the user selects a key, the keyboard interface can be updated in a similar manner but based on characters at a subsequent position in data items that matched the previously selected key.

20 Claims, 13 Drawing Sheets

(56) References Cited

U.S. PATENT DOCUMENTS

2011/0141027 A1\* 6/2011 Ghassabian .......... G06F 3/0237
                                                        345/168
2012/0290984 A1\* 11/2012 Gong ................... G06F 3/0482
                                                        715/841

\* cited by examiner

Person Table 300

| First Name | Last Name | Attribute A | Attribute B |
|---|---|---|---|
| Cecilia | Cardenas | ... | ... |
| Alan | Gonzalez | ... | ... |
| Lucy | Hollinger | ... | ... |
| Elliott | Johnson | ... | ... |
| Andre | Jones | ... | ... |
| Allyssa | Mayer | ... | ... |
| Jessica | Smith | ... | ... |
| Daniel | Thomson | ... | ... |
| Eli | Worthington | ... | ... |
| ... | | | |

Set 301

Cecilia;
Alan;
Lucy;
Elliott;
Andre;
Allyssa;
Jessica;
Daniel;
Eli;
Cardenas;
Gonzalez;
Hollinger;
Johnson;
Jones;
Mayer;
Smith;
Thomson;
Worthington;
...

Set 301 compiled from the entries in the First Name and Last Name columns of person table 300

*FIG. 3*

KEYBOARD INTERFACE FOR EFFICIENTLY SELECTING FROM A SET OF DATA ITEMS

CROSS-REFERENCE TO RELATED APPLICATIONS

N/A

BACKGROUND

Touch screen devices typically provide a keyboard interface by which a user can provide input to an application. Oftentimes, the keyboard interface will not be displayed until the user selects a portion of an application's interface that can receive keyboard input (e.g., a textbox). Once displayed, the keyboard interface will typically consume a large percentage of the screen. This is especially true with smart phones and smaller tablets where the keyboard interface may consume up to 50% of the screen. As a result, there will be limited screen space left for displaying content. In cases where it is desired or necessary to view the content while providing input, the size of the keyboard may substantially degrade the user experience.

BRIEF SUMMARY

The present invention extends to methods, systems, and computer program products for providing a keyboard interface that enables the efficient selection of one or more data items from a set of data items. The appearance of the keyboard interface can be dynamically generated and updated based on characteristics of the data items in the set. When an application requires the selection of one or more data items, one or more character elements of each data item in the set can be evaluated to determine a number of keys to include in the keyboard interface as well as which characters are assigned to each included key. The number of keys and which characters are assigned to these keys can be determined by identifying a first character in each of the character elements.

Then, in response to the user selecting a particular key, the characters assigned to the selected key can be employed to identify a subset of matching character elements. The keyboard interface can then be updated based on an evaluation of a second character in each of the character elements in the subset. This process can be repeated to quickly narrow down the set of data items until a desired data item(s) is found. Because the keyboard interface can be limited to a defined maximum number of keys and because only the set of characters at a particular position in the character elements are assigned to these keys, the overall size of the keyboard interface is greatly reduced without limiting the user's ability to provide appropriate input. As a result, a larger portion of the screen will remain available for displaying content such as the data items.

In some embodiments, the present invention is implemented as a method for generating a keyboard interface for display on a computing device. A set of character elements from a plurality of data items is identified. A list of characters is then compiled where each character in the list appears as a first character in at least one of the character elements in the set. Groupings of the characters in the list are defined where each grouping includes one or more characters from the list. Each grouping of the characters is associated with a particular key of a keyboard interface. The keyboard interface is then caused to be displayed including causing each character in each grouping to be displayed on the particular key that is associated with the grouping.

In another embodiment, the present invention is implemented as computer storage media storing computer executable instructions which when executed by one or more processors implement a method for generating a keyboard interface for display on a computing device. The method includes: identifying a set of character elements from a plurality of data items; compiling a list of characters where each character in the list appears as a first character in at least one of the character elements in the set; determining a defined maximum number of keys for the keyboard interface; defining a number of groupings equal to the defined maximum number of keys, each grouping including one or more characters from the list; associating each grouping of the characters with a particular key of a keyboard interface; and causing the keyboard interface to be displayed including causing each character in each grouping to be displayed on the particular key that is associated with the grouping.

In another embodiment, the present invention is implemented as a method for generating a keyboard interface for display on a computing device. A set of character elements from a plurality of data items is identified. A list of characters is then identified. The list includes each character that appears as a first character in any of the character elements in the set. Groupings of the characters in the list are defined where each grouping includes multiple characters from the list. Each grouping of the characters is associated with a particular key of a keyboard interface. It is then detected that a first key of the keyboard interface has been selected by a user. The characters in the grouping associated with the first key are used to identify a subset of character elements that only includes character elements having a first character that matches one or the characters in the grouping. A second list of characters is compiled. The second list includes each character that appears as a second character in any of the character elements in the subset. Second groupings of the characters in the second list are defined. Each second grouping includes one or more characters from the second list. Each second grouping of the characters is associated with a particular key of the keyboard interface.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 3 illustrates an example data structure in which data items can be defined;

DETAILED DESCRIPTION

In this specification, the term "data item" should be construed as data that defines an individual, entity, or thing and for which a graphical representation can be displayed on a computing device. As examples, data items may define students, employees, schools, companies, awards, etc. A data item is defined by at least one "character element" and possibly many character elements. The term "character element" should be construed as a sequence of one or more characters which defines a characteristic or attribute of the data item. In this context, a "character" should be construed in accordance with its common meaning in computing and would therefore include letters, numbers, punctuation marks, etc. Examples of character elements include words, names, phone numbers, identifiers, addresses, etc.

Figure 1:
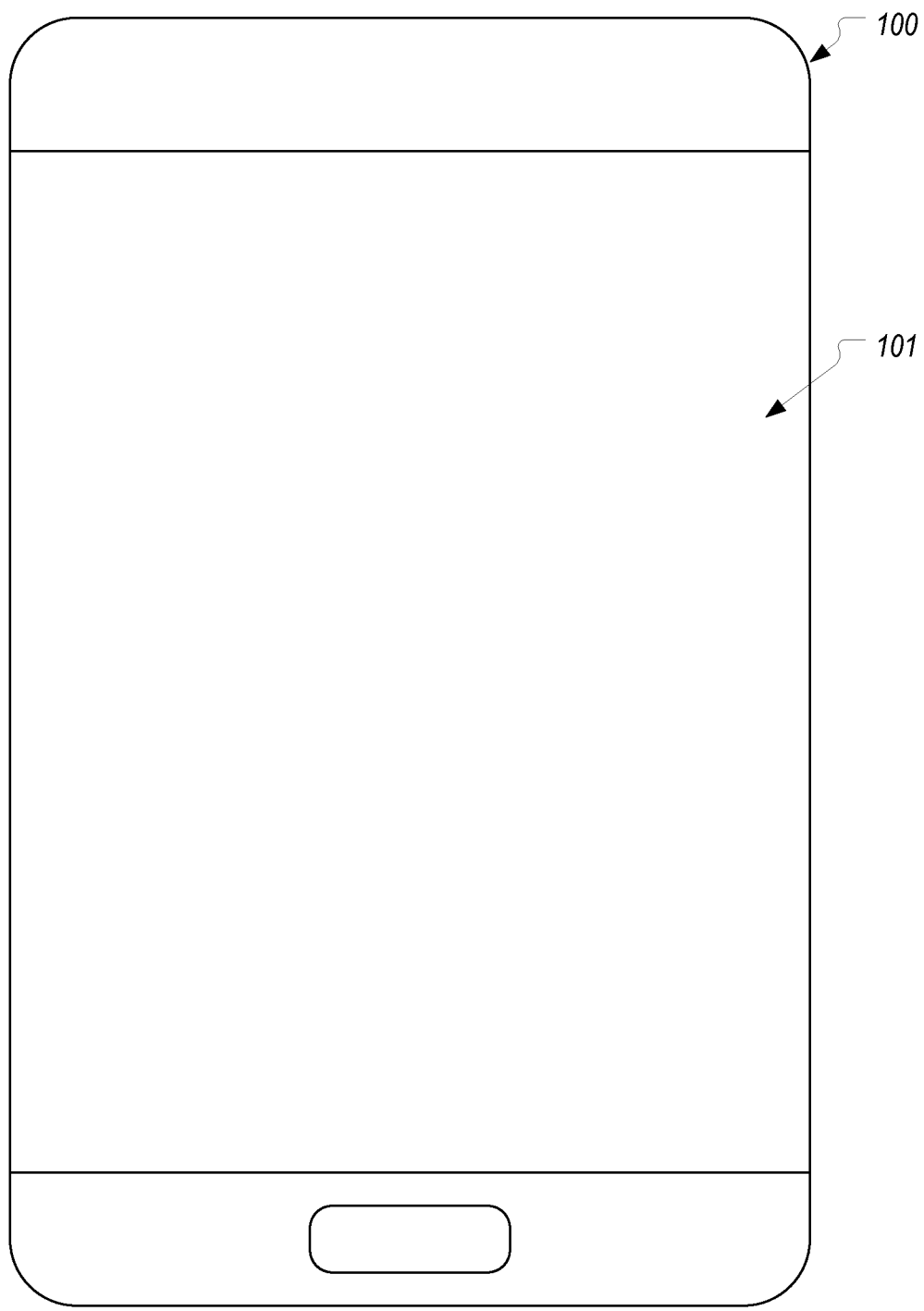
FIG. 1 illustrates an example computing environment in which the present invention can be implemented.

The present invention will be described primarily with reference to a smart phone. For example, FIG. 1 illustrates a smart phone 100 that includes a touch screen 101. It is noted, however, that the present invention can be implemented on any computing device that has a touch screen or that may otherwise employ an onscreen keyboard interface for input. Also, it is noted that the keyboard interface of the present invention typically would not constitute a standalone keyboard application but would be incorporated into an application (e.g., it would be implemented as part of the application's user interface). Such an application may still be configured to employ a standard keyboard interface (e.g., the standard keyboard provided by the Apple iOS or the Android OS) to receive input into some user interface elements while also providing the keyboard interface of the present invention when it is desired to select from among a set of data items. In short, the keyboard interface of the present invention could be implemented within any of the many different types of mobile applications that currently exist or that may be developed. In contrast, in some embodiments, the keyboard interface could be configured as a standalone application that is invoked when another application desires to allow the user to select from a set of data items (e.g., the keyboard interface of the present invention could be invoked in place of the standard keyboard provided by the OS).

Figure 2:
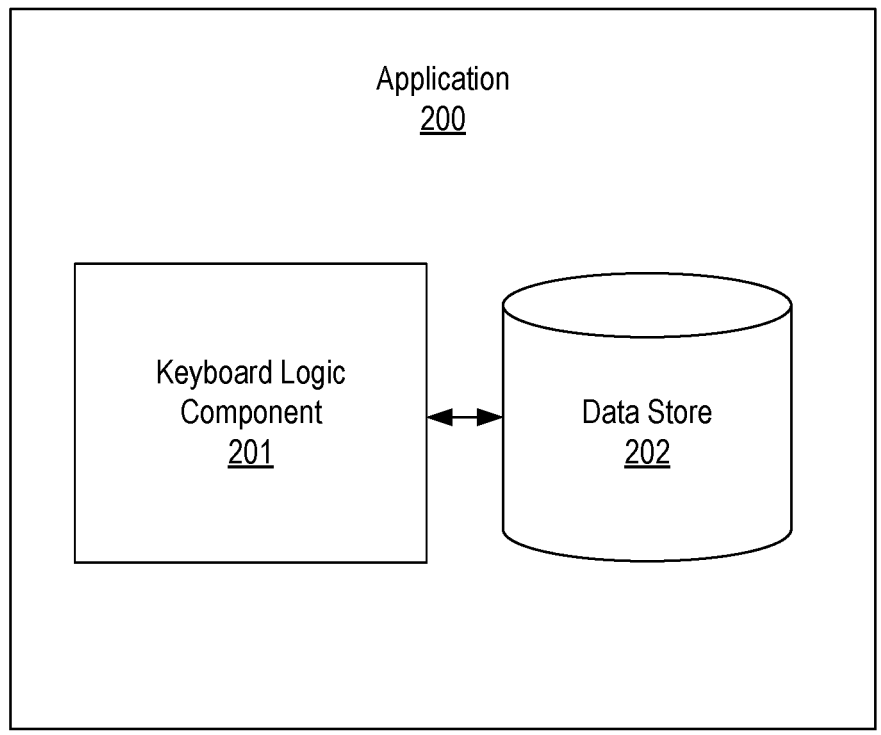
FIG. 2 illustrates an example architecture of an application that is configured in accordance with one or more embodiments of the present invention.

FIG. 2 illustrates the general architecture of an application 200 that is configured to provide a keyboard interface in accordance with embodiments of the present invention. As shown, application 200 can include a keyboard logic component 201 and a data store 202. Although these components are shown as being separate, this is for ease of illustration only. Any suitable structure and/or arrangement of the code that implements the functionality described below could be employed. Also, application 200 can include any number and type of additional components depending on the role of the application.

Keyboard logic component 201 can generally represent the portion of application 200 that implements the logic for determining how the keyboard interface should be displayed and for causing the keyboard interface to be displayed based on this determination. Data store 202 represents one or more data structures in which one or more fixed sets of data items are stored. As represented by the arrow, keyboard logic component 201 can access data store 202 to examine and evaluate the data items in an appropriate set (and more particularly, character elements of such data items) in order to determine how to generate or update the keyboard interface.

FIG. 3 is intended to provide an example of how a set of data items may be defined and is intended to provide context to the following description. FIG. 3 depicts a person table 300 that may be employed by application 200 and stored in data store 202. Person table 300 includes a First Name column, a Last Name column, an Attribute A column, an Attribute B column, and possibly many more columns as represented by the ellipsis. Person table 300 also includes a number of rows each of which defines a particular person data item. For simplicity, only the First Name and Last Name are populated in the rows. Person table 300 may define any number of persons as represented by the ellipsis at the bottom of the table.

As mentioned above, a data item is formed of one or more character elements. In this example, the value defined in the First Name, Last Name, Attribute A, and Attribute B columns can each be considered a character element. Not all character elements that define a particular type of data item need to be employed in embodiments of the present invention. Instead, keyboard logic component 201 can be configured to employ any appropriate set of character elements for a given scenario. In the following example, only the First Name and Last Name character elements of the person data items will be employed. Accordingly, FIG. 3 shows that a set 301 is compiled to include the 18 names (i.e., character elements) that are defined in these two columns.

FIGS. 4A-4D provide an example of how keyboard logic component 201 can initialize and display a keyboard interface based on set 301. To facilitate an understanding of this process, these figures show an example of the user interface (on the left) and a representation of the corresponding processing that can be performed when the user interface is displayed (on the right). In this example, it will be assumed that application 200 allows a user to view and select a particular person from the persons defined in table 300 (or at least from a subset of the persons defined in table 300). As a non-limiting example, the user may be a teacher and the persons may be students in a particular class.

Figure 4A:
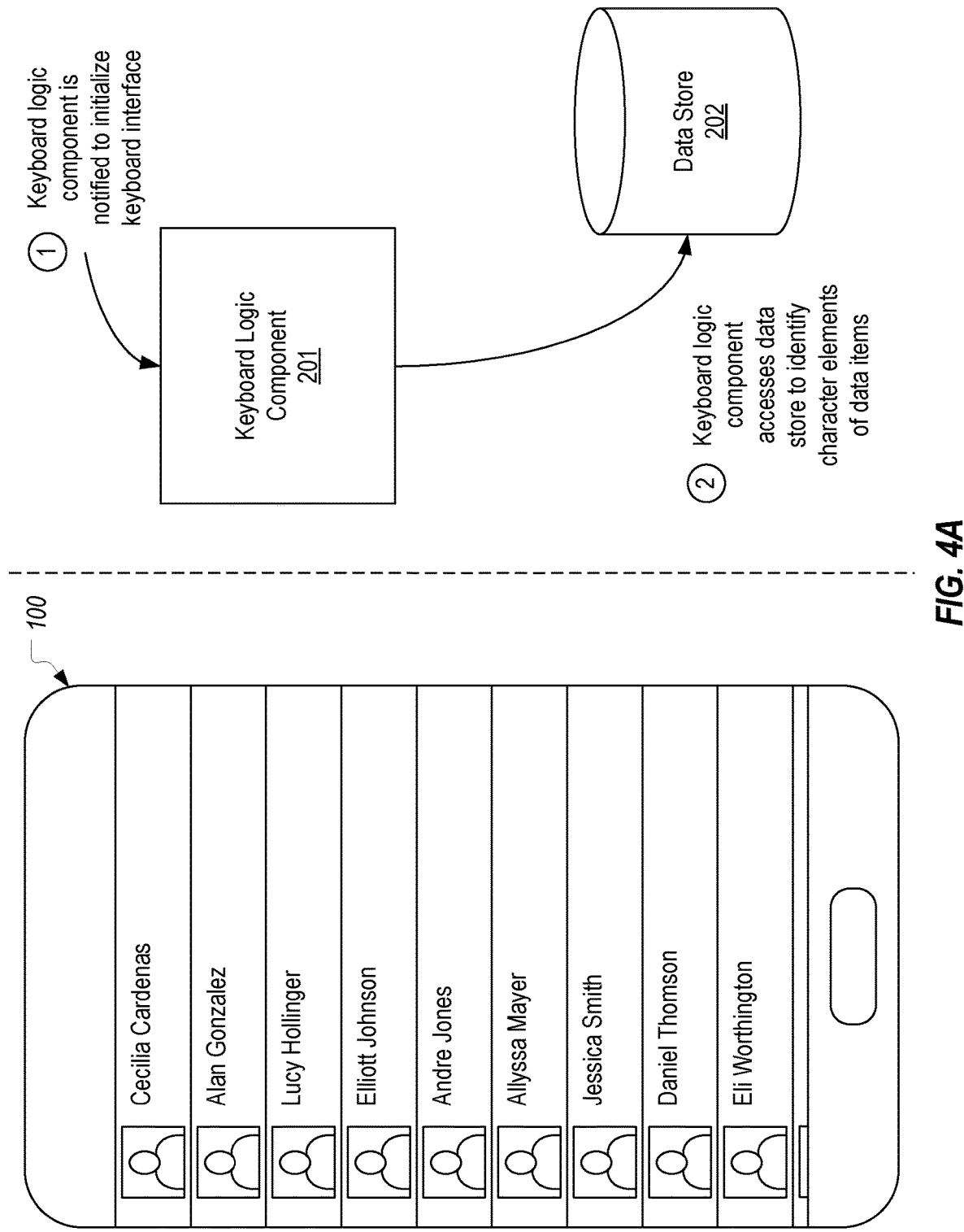
FIGS. 4A-4D illustrate an example of how a keyboard interface can be generated based on one or more character elements of data items.

In FIG. 4A, it will be assumed that the user has navigated within application 200's user interface to a point where the user is able to select from among the various persons that are defined in person table 300. For example, application 200 can enable a teacher to select one of his or her students for a particular purpose (e.g., to review information about the student, to issue an award to the student, to provide feedback to the student, etc.).

In step 1, keyboard logic component 201 is notified to initialize a keyboard interface. In some cases, this notification may occur in response to user input. For example, the user may select an option within application 200's user interface which will then allow the user to select from the various persons (e.g., an option to provide an award to a student). In short, step 1 can be performed when it is necessary to generate and display a keyboard interface. To provide context, in FIG. 4A, smart phone 100 is shown as already displaying representations of the persons (or data items) but no keyboard interface is shown. However, in some embodiments, application 200 can cause such representations and a keyboard interface to be displayed at the same time.

In step 2, and as part of the initialization process, keyboard logic component 201 can access data store 202 to identify the appropriate character elements of the relevant person data items. Although not shown, as part of step 1, keyboard logic component 201 can be provided with information that identifies which data items and/or which character elements should be employed to generate the keyboard interface. In this current example, keyboard logic component 201 could be notified that a keyboard interface should be generated for persons in person table 300. In cases where person table 300 may include persons that would not be relevant to the current user, keyboard logic component 201 could also be provided with information identifying the user to allow it to extract only persons relevant to that user (e.g., students that are in the teacher's class). Such information can be obtained/provided based on the state of application 200 (e.g., which user is logged in, what input the user has provided, etc.). In any case, keyboard logic component 201 receives and/or obtains the necessary information to be able to identify the appropriate character elements in step 2.

Figure 4B:
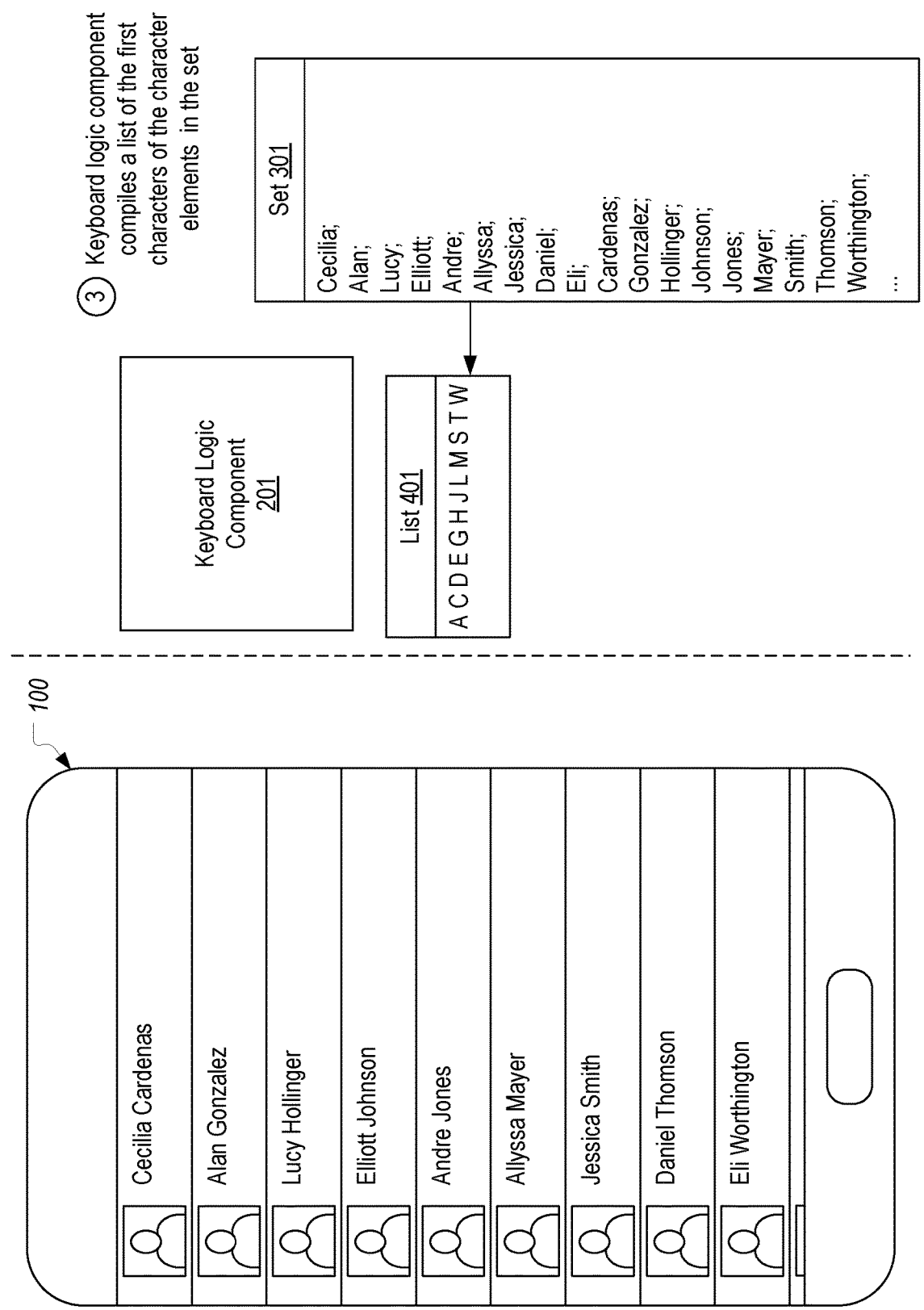
Figure 4C:
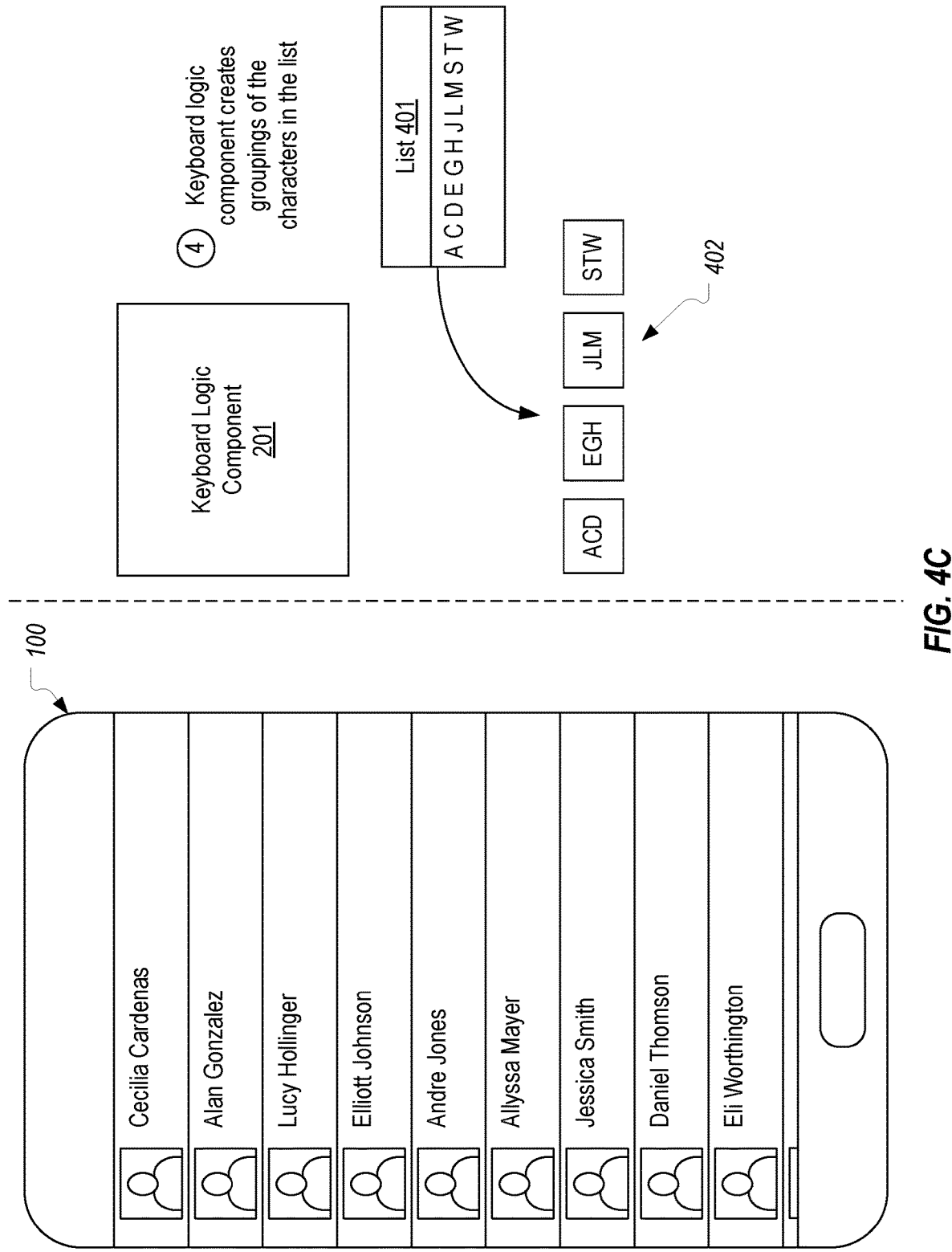

As indicated above, it will be assumed that the first name and last name character elements of the person data items are to be used to generate a keyboard interface for selecting person data items. Accordingly, FIG. 4B shows that keyboard logic component 201 has generated a set 301 that includes the first name and last name of each person defined in table 300. In step 3, keyboard logic component 201 processes each character element in set 301 to compile a list of the first characters in these character elements. In this example, list 401 will include A, C, D, E, G, H, J, L, M, S, T, W since each of these characters is the first character in at least one of the character elements in set 301.

With list 401 compiled, keyboard logic component 201 may then create groupings of the characters in list 401. The number of groupings that are created can depend on the number of characters in list 401 and on a maximum number of keys parameter (which may be a configurable setting and/or may vary based on the size and/or orientation of the touch screen). In this example, it will be assumed that the maximum number of keys parameter is set to four and therefore keyboard logic component 201 has created four groupings 402 of three characters each. Although groupings 402 are in order in this example, this need not be the case. In some embodiments, keyboard logic component 201 can take into account the number of occurrences of each character when creating the groupings. For example, keyboard logic component 201 may combine characters into groupings in a manner that minimizes the number of data items (e.g., persons) that will map to each grouping. With reference to set 301, because J and A are each the first character in three character elements (while the other characters occur only twice or once), keyboard logic component 201 may choose to place these two characters in separate groupings. As will become apparent below, this may facilitate the narrowing down of matching data items when a key is selected (i.e., it will ensure that one key does not match a large number of data items with respect to the other keys).

Figure 4D:
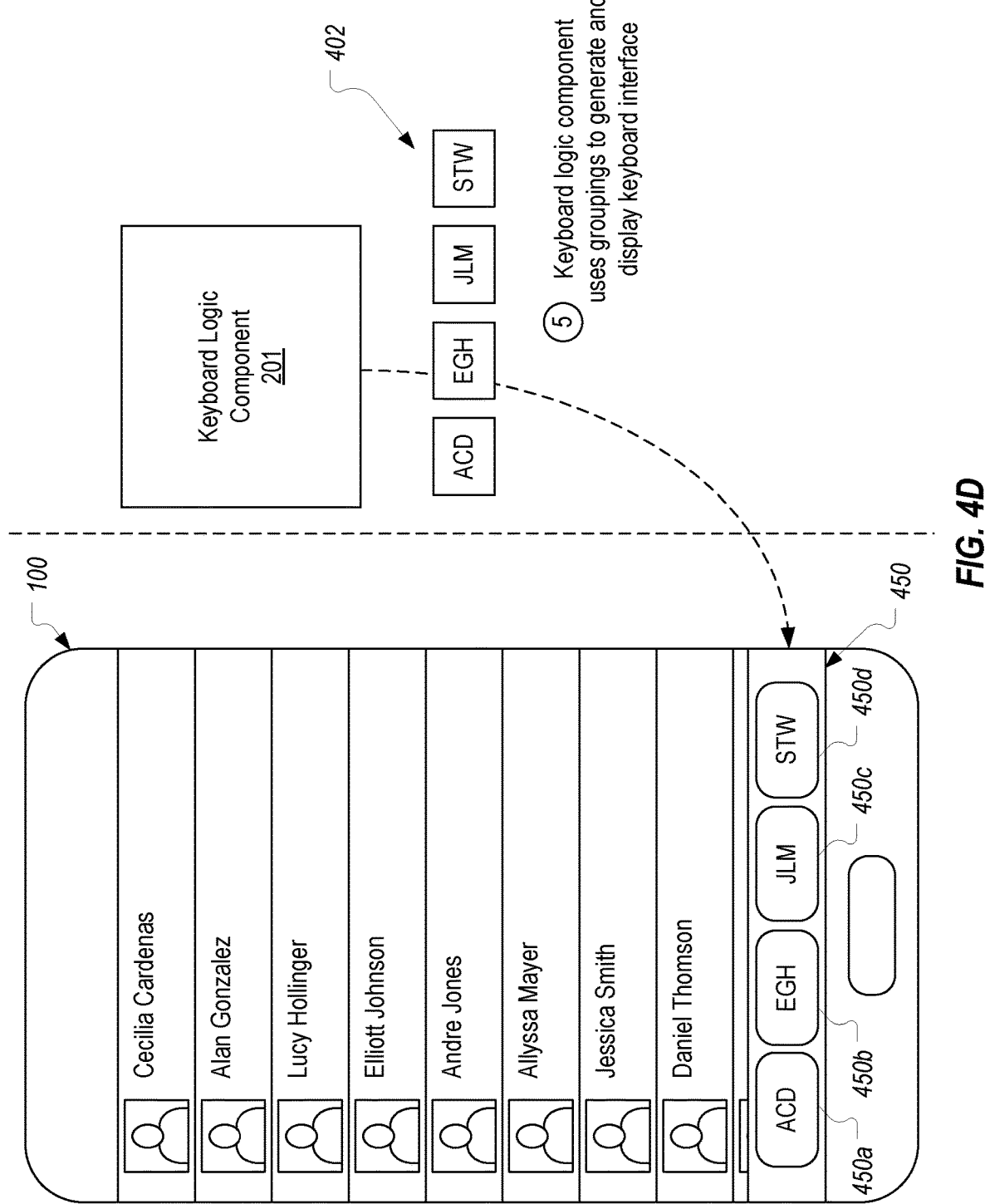

As represented in step 5 in FIG. 4D, once keyboard logic component 201 has generated groupings 402, each grouping can be associated with a user interface element (e.g., a button) that represents a key of the keyboard interface. Keyboard logic component 201 can also customize each user interface element to include representations of the characters in the associated grouping and then display the user interface elements or "keys" 450a-450d as keyboard interface 450. As mentioned above, the display of keyboard interface 450 could occur substantially simultaneous with the display of the person representations as opposed to after the representations are displayed.

The actual creation and display of the user interface elements/keyboard interface can be performed using any of the suitable techniques provided by the various programming environments (e.g., JavaScript). Of importance to the present invention is the fact that the keyboard interface as initially displayed will include a limited number of "character keys" (e.g., up to the number defined in the maximum number of keys parameter) and each of these keys will be associated with one or more characters that each appear in the first position of at least one character element in a corresponding set.

As can be seen in FIG. 4D, keyboard interface 450 consumes much less of the touch screen than a typical keyboard interface. Because keyboard interface 450 includes keys that display each character that appears as the first character in a character element in set 301, the user can commence the selection of a particular data item by selecting the key that displays the first character in one or more of the data item's character elements. For example, a teacher can select a particular student by selecting the key that has the first letter in the student's first or last name. This is in contrast to the typical approach of providing a textbox which when selected causes a standard keyboard to be displayed to allow the user to type in the student's name.

FIGS. 5A-5E continue the example from FIGS. 4A-4D and illustrate how keyboard logic component 201 updates keyboard interface 450 based on the user selection of one of keys 450a-450d and based on the character elements in set 301. In step 1 shown in FIG. 5A, it will be assumed that the user has selected key 450b which in turn will cause keyboard logic component 201 to be notified of the selection (e.g., via a callback function corresponding to key 450b being invoked). In step 2, keyboard logic component 201 can identify the grouping that is associated with key 450b to determine which characters have been selected. In this example, keyboard logic component 201 will determine that characters E, G, and H are associated with the selected key.

Figure 5A:
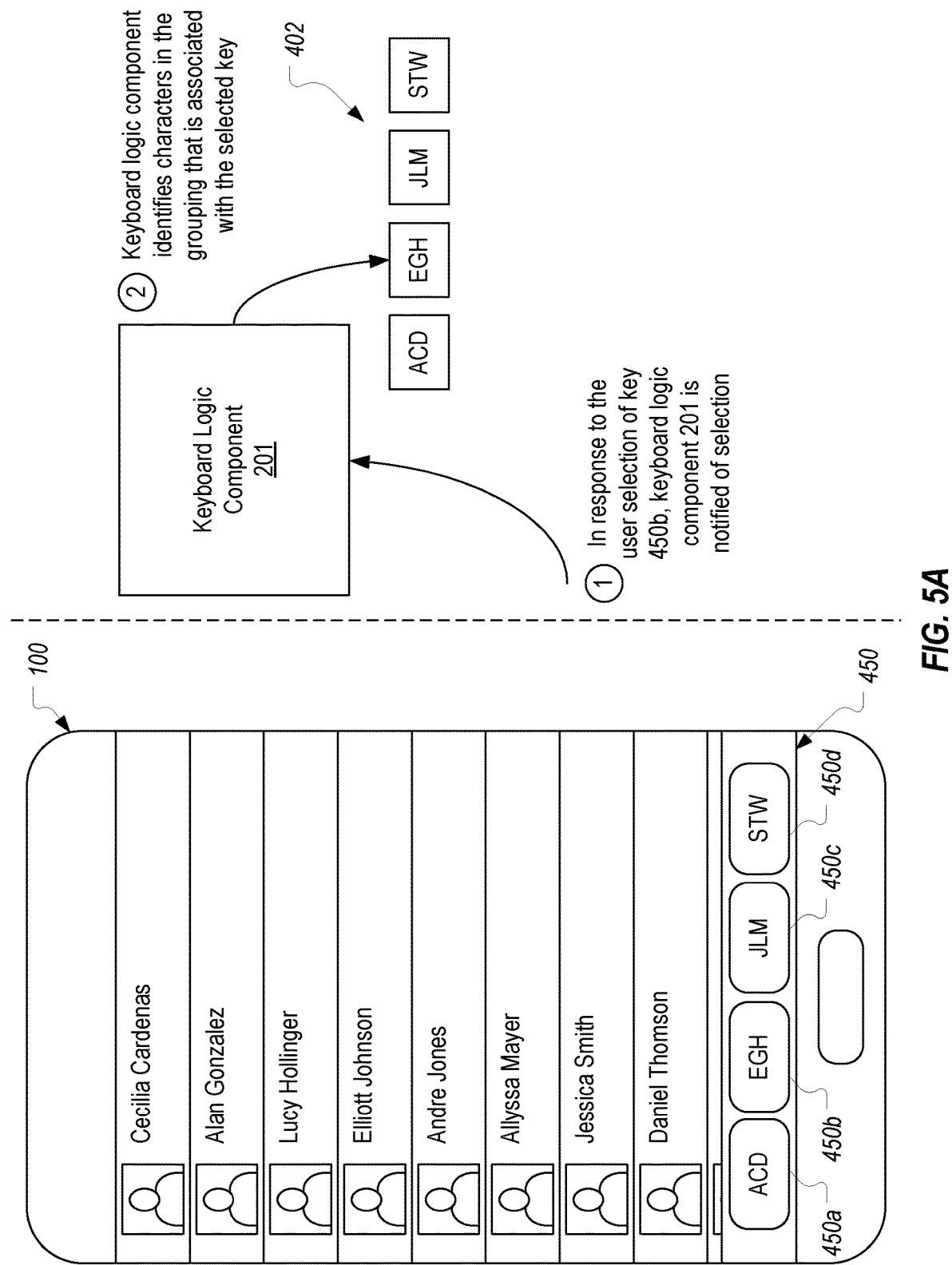
FIGS. 5A-5E illustrate an example of how the keyboard interface of FIGS. 4A-4D can be updated when the user selects a particular key in the keyboard interface.
Figure 5B:
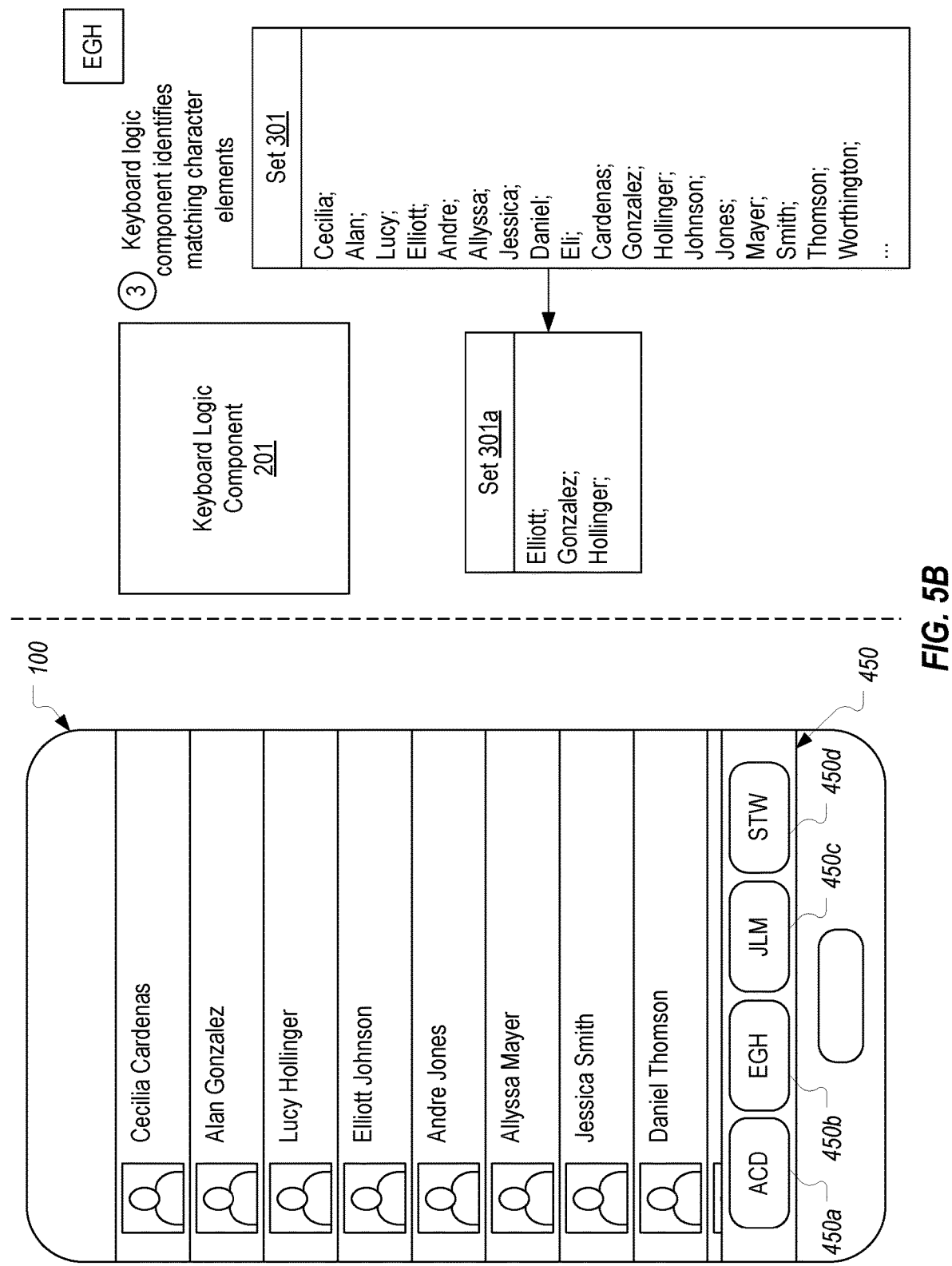

Keyboard logic component 201 can employ each character in the grouping associated with a selected key to identify matching character elements in set 301. A character element is matching when its first character matches any of the characters in the grouping associated with the selected key. For example, as shown in FIG. 5B as step 3, keyboard logic component 201 has determined that the character elements Elliott, Gonzalez, and Hollinger are matching character elements and are therefore logically grouped into subset 301a. At this point, keyboard logic component 201 substantially repeats steps 3-5 from FIGS. 4B-4D to update keyboard interface 450 except that the list of characters will be generated from subset 301a and will be based on the second character rather than the first character of the character elements in subset 301a. Further iterations would involve a further reduced subset and would be based on the third character and so on until no further narrowing of data items can be performed.

Figure 5C:
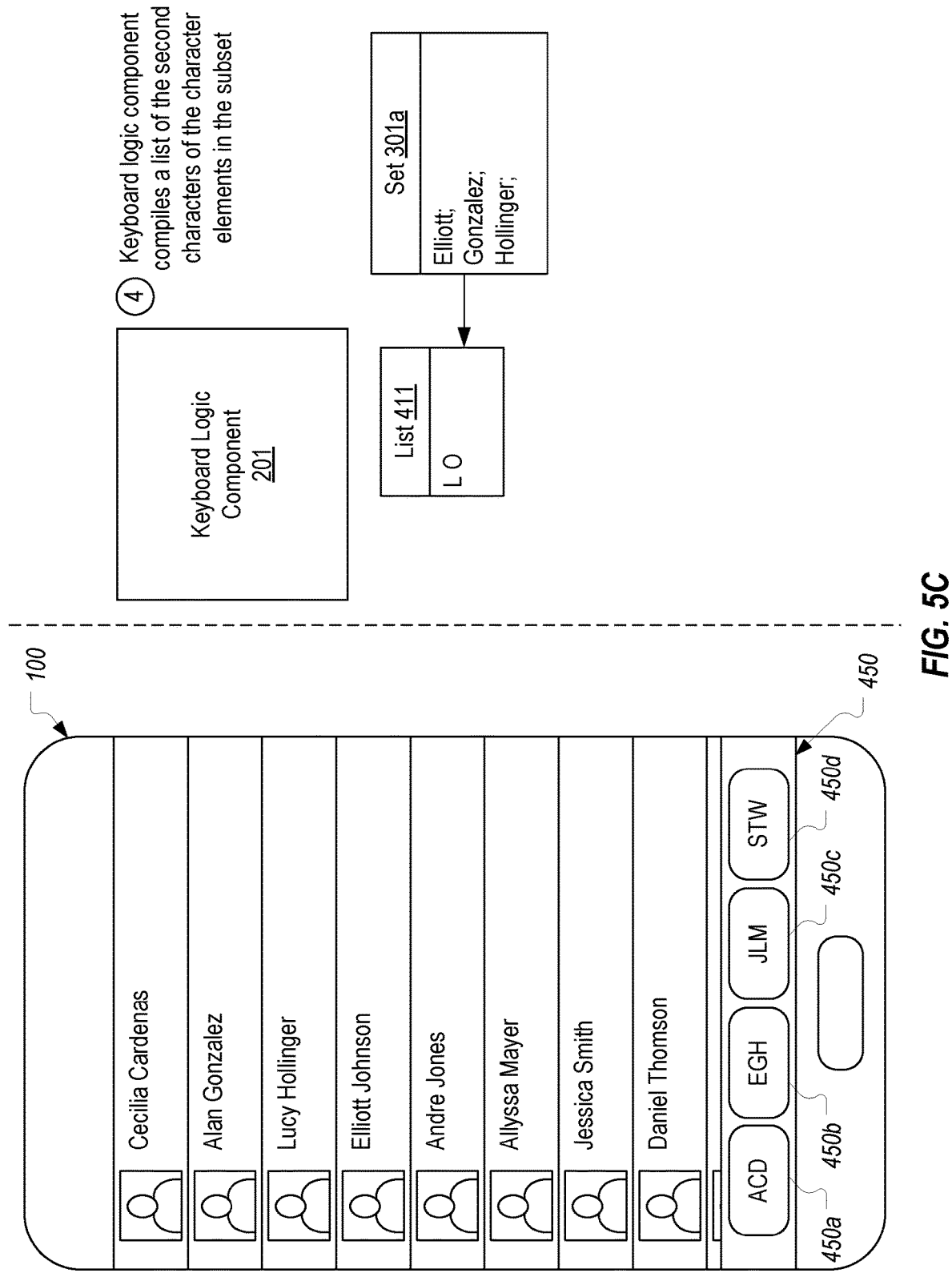
Figure 5D:
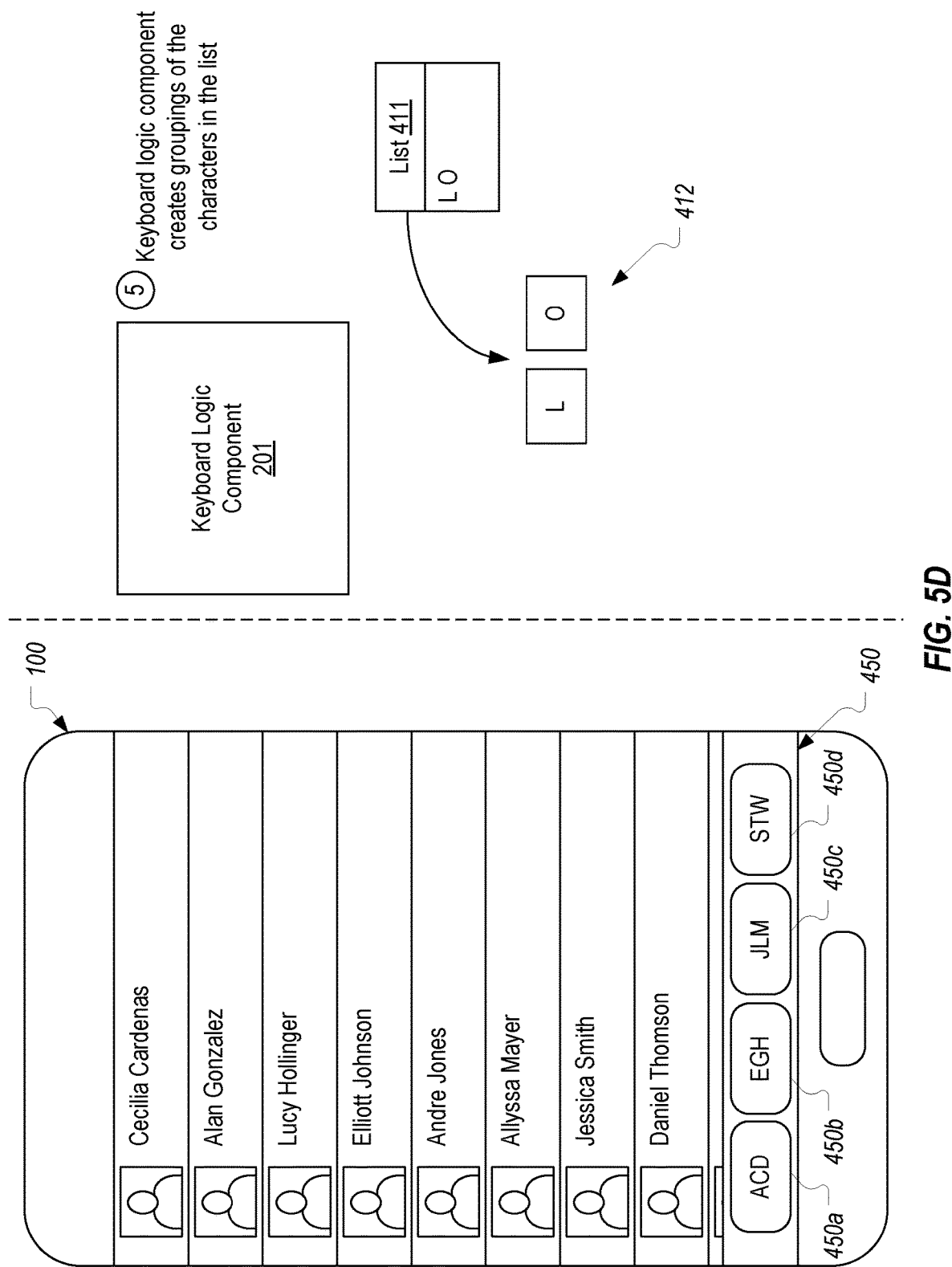

Continuing the example, in step 4 shown in FIG. 5C, keyboard logic component 201 evaluates the character elements in subset 301a to identify which characters appear as the second character in the character elements. In this case, list 411 will only include the characters L and O. In step 5 shown in FIG. 5D, keyboard logic component 201 can create groupings 412 of the characters in list 411. Because there are only two characters in this example, it will be assumed that two groupings are created. Next, in step 6 shown in FIG. 5E, keyboard logic component 201 can associate each grouping with a particular key and then update keyboard interface 450 accordingly. In conjunction with updating keyboard interface 450, application 200 can also update which person data items are displayed so that only matching persons remain. To accomplish this, keyboard logic component 201 may report which character elements are matches to the appropriate component of application 200 to allow the corresponding persons to be identified and representations of those persons to be displayed. As indicated by the underlines in FIG. 5E, in some embodiments, the displayed representation of the data item can include the character elements with the matching character highlighted or otherwise identified.

Additionally, whenever keyboard interface 450 is updated in response to the user's selection of a key, keyboard logic component 201 can cause a "backspace key" to be included in keyboard interface 450. The selection of the backspace key would return the state of the keyboard interface (and of keyboard logic component 201) to the state that existed prior to the user's selection of the key. In this example, the selection of the backspace key would return the state of keyboard interface 450 to what is shown in FIG. 4D thereby allowing the user to recommence the process of selecting a particular person.

Figure 5E:
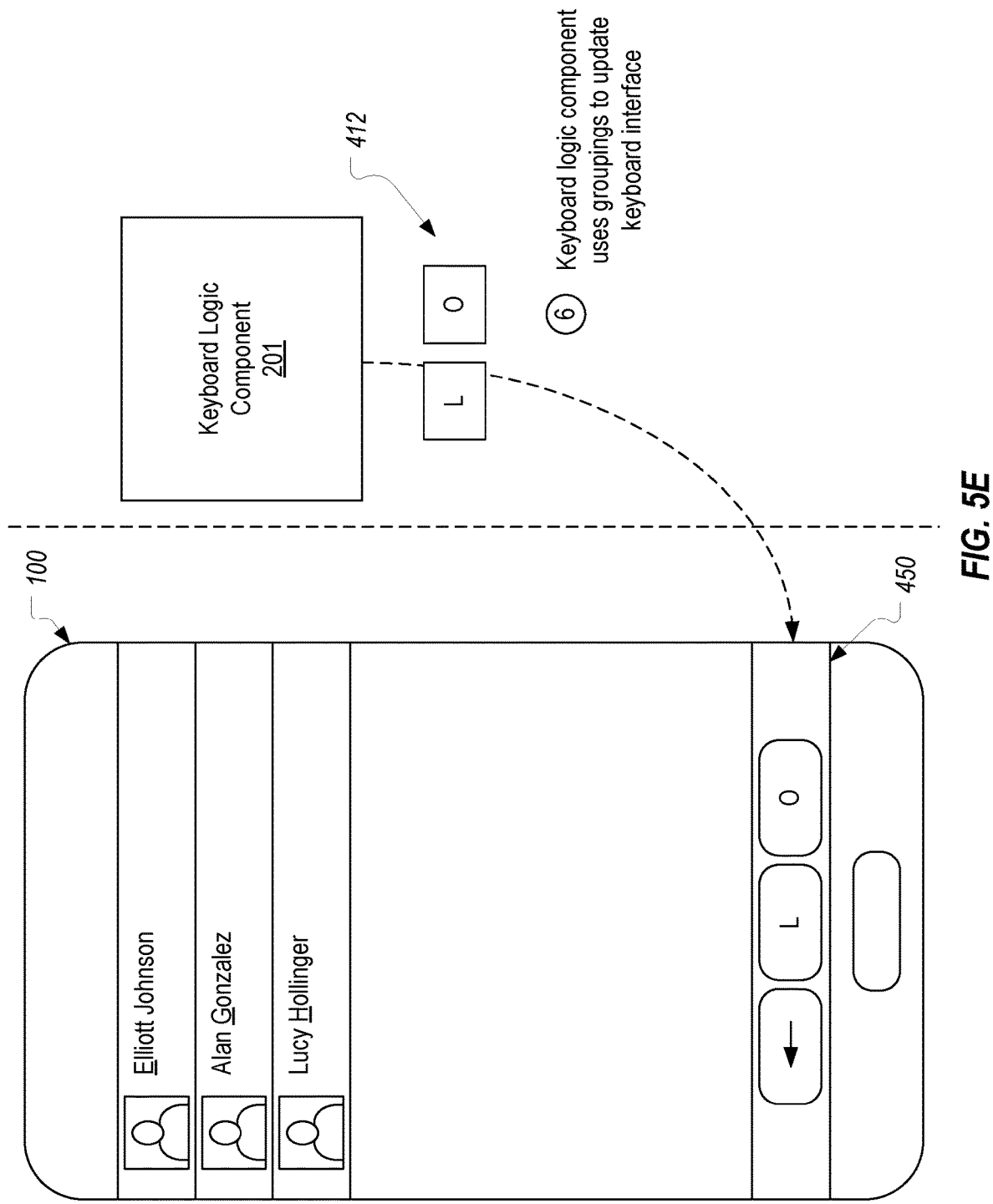

The update process depicted in FIGS. 5A-5E can be repeated each time the user selects a key. For example, if the user selects the L key as shown in FIG. 5E, keyboard logic component 201 can repeat the process by identifying matching character elements (i.e., those that start with EL, GL, or HL) and then identifying each character that is the third character in any of the matching character elements. This iterative process allows the user to quickly identify and select a desired data item without using a standard keyboard.

At some point in this iterative process, it will no longer be possible to further reduce the number of matching data items. For example, if the user selects the L key as shown in FIG. 5E, keyboard logic component 201 would determine that the only matching character element is Elliott (because no other character elements start with EL) and therefore the only matching data item is the Elliott Johnson data item. It is noted that the same result could be reached if another person were also named Elliott such that the number of data items could not be reduced below two. Upon reaching this point where the number of data items can no longer be reduced, keyboard logic component 201 may present some visual, audible, and/or haptic indicator to inform the user accordingly. Also, in some embodiments, keyboard logic component 201 may reset keyboard interface 450 to its initialized state (e.g., to what is shown in FIG. 4D). Resetting keyboard interface 450 in this manner will allow the user to quickly restart the process (since all possible first characters will again be displayed) in case the desired data item was not found (e.g., if the user employed the wrong spelling). In some embodiments, keyboard interface 450 can also be reset to its initialized state after the user selects a particular data item. For example, if the user selects the representation for Elliott Johnson in FIG. 5E and application 200 is configured to allow the user to select multiple persons, keyboard logic component 201 can restart the process to allow the user to quickly identify and select another person.

One exemplary, but non-limiting, usage of the present invention is in the form of a classroom management application. In such a case, a teacher may have the ability to present digital awards to students. To facilitate this process on a mobile device, when the teacher desires to select an award (which would be a type of data item) to present to a student (which is another type of data item), the keyboard interface can be displayed as described above. More particularly and assuming the teacher would select an award prior to selecting a student, keyboard logic component 201 can identify relevant awards (e.g., those that are available to a current class), identify character elements of the identified awards (e.g., names of the award), and then generate/update the keyboard interface as described above. Once the teacher selects a particular award, the user interface can transition to display the students with an appropriate instance of the keyboard interface (e.g., as shown in FIG. 4D).

Figure 6:
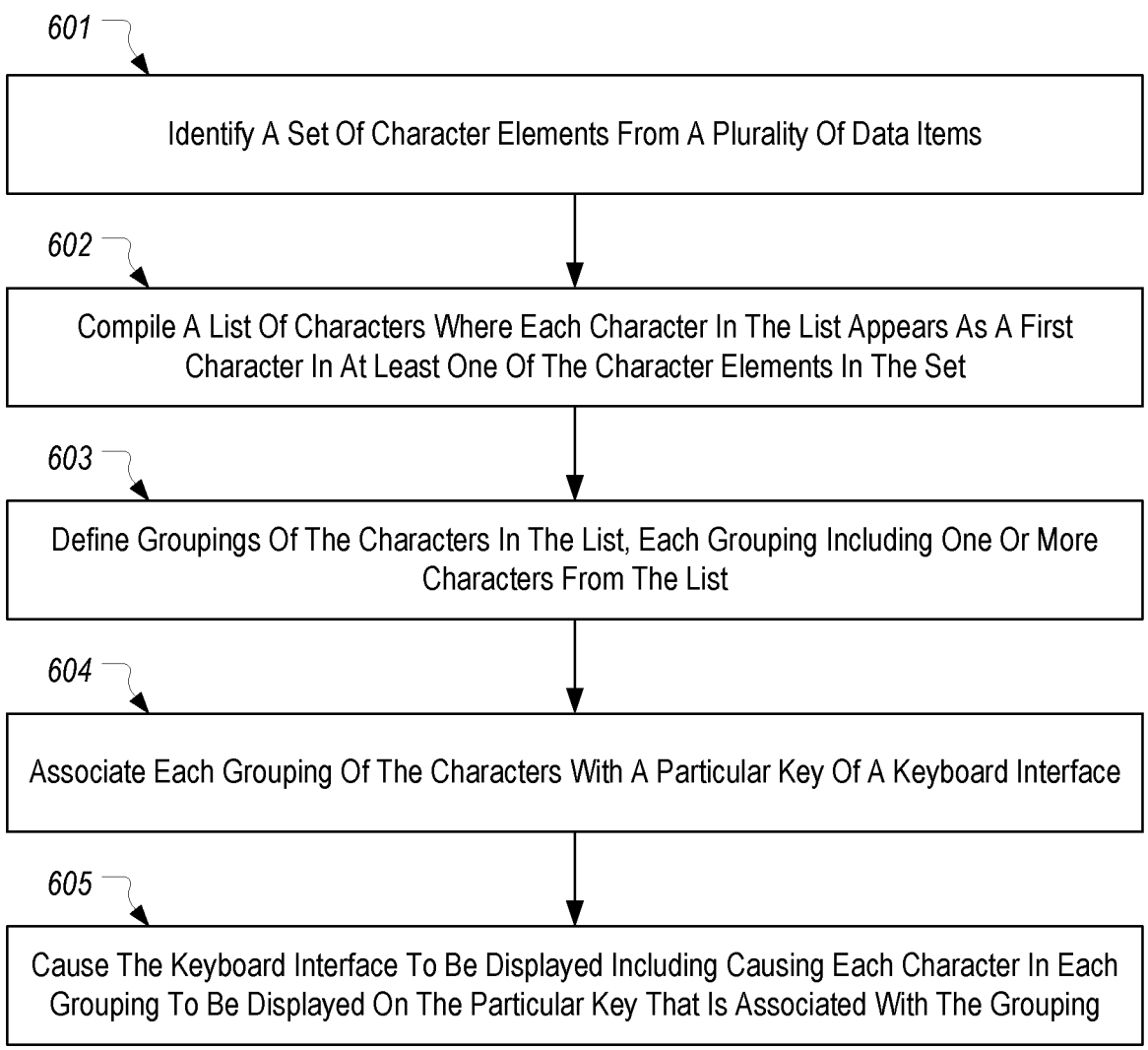
FIG. 6 illustrates a flowchart of an example method for generating a keyboard interface.

FIG. 6 provides a flowchart of an example method 600 for generating a keyboard interface for display on a computing device. Method 600 can be performed by keyboard logic component 201 that is part of an application that executes on a touch screen device or another computing device that employs an onscreen keyboard. Method 600 could also be performed by a keyboard application that is employed by a separate application to receive input.

Method 600 includes an act 601 of identifying a set of character elements from a plurality of data items. For example, keyboard logic component 201 can identify the first name and last name of each person (or a subset of persons) that is defined in person table 300. Similarly, keyboard logic component 201 could identify the names of awards or character elements of any other type of data item.

Method 600 includes an act 602 of compiling a list of characters where each character in the list appears as a first character in at least one of the character elements in the set. For example, keyboard logic component 201 can generate list 401 as the set of first letters in the names included in set 301.

Method 600 includes an act 603 of defining groupings of the characters in the list, each grouping including one or more characters from the list. For example, keyboard logic component 201 can group together the letters in list 401.

Method 600 includes an act 604 of associating each grouping of the characters with a particular key of a keyboard interface. For example, keyboard logic component 201 can define mappings between each of the four groupings 402 and the corresponding keys 450a-450d.

Method 600 includes an act 605 of causing the keyboard interface to be displayed including causing each character in each grouping to be displayed on the particular key that is associated with the grouping. For example, keyboard logic component 201 can cause keyboard interface 450 to be displayed as part of application 200's user interface or in conjunction with application 200's user interface.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for generating a keyboard interface for display on a computing device comprising:
    identifying a set of names from a plurality of data items;
    evaluating the set of names to identify a first character in each of the names in the set;
    based on the evaluation, compiling a list of characters where each character in the list appears as a first character in at least one of the names in the set;
    employing the list to define groupings of the characters in the list, each grouping including one or more characters from the list;
    associating each grouping of the characters with a particular key of a keyboard interface;
    causing the keyboard interface to be displayed including causing each character in each grouping to be displayed on the particular key that is associated with the grouping;
    in response to user selection of a first key in the displayed keyboard interface, identifying the one or more characters in the grouping that is associated with the first key;
    identifying a subset that includes only names in the set that have a first character matching any of the one or more characters in the grouping that is associated with the first key;
    compiling a second list of characters where each character in the second list appears as a second character in at least one of the names in the subset;
    defining second groupings of the characters in the second list, each second grouping including one or more characters from the second list;
    associating each second grouping with a particular key of the keyboard interface; and
    causing the keyboard interface to be updated including causing each character in each second grouping to be displayed on the particular key that is associated with the second grouping.

2. The method of claim 1, wherein the plurality of data items includes multiple types of data items.

3. The method of claim 1, wherein the data items define persons.

4. The method of claim 3, wherein the names are first names and last names of the persons.

5. The method of claim 1, wherein defining groupings comprises defining a number of groupings equal to a defined maximum number of keys to be included in the keyboard interface.

6. The method of claim 1, wherein the groupings are disjoint and each grouping includes at least two characters from the list.

7. The method of claim 1, further comprising:
    causing a backspace key to be included in the updated keyboard interface.

8. The method of claim 7, further comprising:
    in response to user selection of the backspace key, reverting the keyboard interface to an initial state by causing each character in each grouping to be displayed on the particular key that is associated with the grouping.

9. The method of claim 1, wherein representations of at least some of the plurality of data items are displayed in conjunction with the keyboard interface prior to updating the keyboard interface, the method further comprising:
    in conjunction with updating the keyboard interface, updating the display of the representations to exclude representations of data items to which the names in the subset do not pertain.

10. The method of claim 1, further comprising:
    reverting the keyboard interface to an initial state.

11. The method of claim 10, wherein the keyboard interface is reverted to an initial state in response to determining that data items can no longer be narrowed.

12. The method of claim 10, wherein the keyboard interface is reverted to an initial state in response to user selection of a data item.

13. The method of claim 1, wherein, in response to user selection of a data item, the method further comprises:
    identifying a second set of names from a different plurality of data items;
    employing the second set of names to compile a list of characters for the second set where each character in the list appears as a first character in at least one of the names in the second set;
    employing the list of characters for the second set to define groupings of the characters in the list for the second set, each grouping including one or more characters from the list for the second set;
    associating each grouping of the characters with a particular key of the keyboard interface; and
    causing the keyboard interface to be displayed including causing each character in each grouping to be displayed on the particular key that is associated with the grouping.

14. The method of claim 13, wherein the plurality of data items is one of persons or awards and the different plurality of data items is the other of persons or awards.

15. One or more computer storage media storing computer executable instructions which when executed by one or more processors implement a method for generating a keyboard interface for display on a computing device comprising:

identifying a set of names from a plurality of data items;

evaluating the set of names to identify a first character in each of the names in the set;

based on the evaluation, compiling a list of characters where each character in the list appears as a first character in at least one of the names in the set and the list includes each character that appears as the first character in any of the names;

determining a defined maximum number of keys for the keyboard interface;

employing the list to define a number of groupings equal to the defined maximum number of keys, each grouping including one or more characters from the list such that each character from the list is assigned to a particular grouping;

associating each grouping of the characters with a particular key of a keyboard interface;

causing the keyboard interface to be displayed including causing each character in each grouping to be displayed on the particular key that is associated with the grouping;

in response to user selection of a first key in the displayed keyboard interface, identifying the one or more characters in the grouping that is associated with the first key;

identifying a subset that includes only names in the set that have a first character matching any of the one or more characters in the grouping that is associated with the first key;

compiling a second list of characters where each character in the second list appears as a second character in at least one of the names in the subset;

defining second groupings of the characters in the second list, each second grouping including one or more characters from the second list;

associating each second grouping with a particular key of the keyboard interface; and causing the keyboard interface to be updated including causing each character in each second grouping to be displayed on the particular key that is associated with the second grouping.

16. The computer storage media of claim 15, wherein the groupings are disjoint.

17. The computer storage media of claim 15, wherein causing the keyboard interface to be updated includes causing a backspace key to be included in the updated keyboard interface.

18. The computer storage media of claim 15, wherein the defined maximum number of keys is less than or equal to five.

19. The computer storage media of claim 15, wherein the method further comprises:

causing a backspace key to be included in the updated keyboard interface.

20. The computer storage media of claim 19, wherein the method further comprises:

in response to user selection of the backspace key, reverting the keyboard interface to an initial state by causing each character in each grouping to be displayed on the particular key that is associated with the grouping.

* * * * *